(12) United States Patent
Medvedev et al.

(10) Patent No.: US 9,879,174 B2
(45) Date of Patent: Jan. 30, 2018

(54) METHOD OF FLUID SLUG CONSOLIDATION WITHIN A FLUID SYSTEM IN DOWNHOLE APPLICATIONS

(75) Inventors: Anatoly Vladimirovich Medvedev, Moscow (RU); Alexander Igorevich Titkov, Novosibirsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 1023 days.

(21) Appl. No.: 13/514,988

(22) PCT Filed: Dec. 30, 2009

(86) PCT No.: PCT/RU2009/000750
§ 371 (c)(1),
(2), (4) Date: Aug. 27, 2012

(87) PCT Pub. No.: WO2011/081546
PCT Pub. Date: Jul. 7, 2011

(65) Prior Publication Data
US 2012/0309653 A1 Dec. 6, 2012

(51) Int. Cl.
*C09K 8/08* (2006.01)
*C09K 8/44* (2006.01)
(Continued)

(52) U.S. Cl.
CPC .............. *C09K 8/601* (2013.01); *C09K 8/42* (2013.01); *C09K 8/68* (2013.01); *C09K 8/805* (2013.01); *C09K 2208/08* (2013.01)

(58) Field of Classification Search
None
See application file for complete search history.

(56) References Cited

U.S. PATENT DOCUMENTS 3,581,824 A * 6/1971 Hurd .................... C09K 8/905
166/246
3,865,779 A 2/1975 Oya et al.
(Continued)

FOREIGN PATENT DOCUMENTS

CN 1639445 A 7/2005
CN 101553552 A 10/2009
(Continued)

OTHER PUBLICATIONS

Official Action dated Jun. 27, 2013 for Mexican Patent Application No. MX/a/2012/007645, including Agent's English translation of Examiner's comments, 9 pages total.
(Continued)

*Primary Examiner* — Jeffrey Washville
(74) *Attorney, Agent, or Firm* — Michael L. Flynn; Robin Nava

(57) ABSTRACT

A fluid slug consolidation is maintained in a fluid system for use in downhole applications. The fluid system has an interfacing fluid of a different character adjacent to the fluid slug. The method is carried out by admixing a particulate material with at least one of the fluid slug and adjacent interfacing fluid in an amount wherein discrete interfacing fluid margins are formed between the slug and the adjacent interfacing fluid under laminar flow conditions. The fluid system is introduced into a well bore of a well formed in a subterranean formation. In certain applications at least a portion of the particulate material is provided with adhesive properties to facilitate aggregation of the particulate material within the at least one of the fluid slug and adjacent interfacing fluid.

18 Claims, 4 Drawing Sheets

(51) Int. Cl.
*C09K 8/68* (2006.01)
*C09K 8/60* (2006.01)
*C09K 8/80* (2006.01)
*C09K 8/42* (2006.01)

(56) References Cited

U.S. PATENT DOCUMENTS

| | | |
|---|---|---|
| 3,929,191 A | 12/1975 | Wayne et al. |
| 3,937,283 A | 2/1976 | Blauer et al. |
| 4,339,273 A | 7/1982 | Meier et al. |
| 4,453,598 A | 6/1984 | Singer et al. |
| 4,585,064 A | 4/1986 | Graham et al. |
| 5,422,183 A | 6/1995 | Sinclair et al. |
| 5,582,249 A | 12/1996 | Caveny et al. |
| 5,855,663 A | 1/1999 | Takano et al. |
| 6,085,844 A | 7/2000 | Palmer et al. |
| 6,172,011 B1 | 1/2001 | Card et al. |
| 6,435,277 B1 | 8/2002 | Qu et al. |
| 6,703,352 B2 | 3/2004 | Dahayanake et al. |
| 6,723,162 B1 | 4/2004 | Cheyrezy et al. |
| 6,742,590 B1 | 6/2004 | Nguyen |
| 7,174,961 B2 | 2/2007 | Chatterji et al. |
| 7,380,601 B2 | 6/2008 | Willberg et al. |
| 7,398,828 B2 | 7/2008 | Daccord et al. |
| 7,441,600 B2 | 10/2008 | Brothers et al. |
| 7,581,590 B2 | 9/2009 | Lesko et al. |
| 2003/0106690 A1 | 6/2003 | Boney et al. |
| 2004/0182577 A1* | 9/2004 | Chatterji .......... C09K 8/04 166/305.1 |
| 2005/0016732 A1 | 1/2005 | Brannon et al. |
| 2008/0093073 A1* | 4/2008 | Bustos .......... C09K 8/68 166/279 |
| 2008/0093264 A1 | 4/2008 | Sarkar et al. |
| 2008/0135242 A1 | 6/2008 | Lesko et al. |
| 2009/0203555 A1* | 8/2009 | Milne .......... C09K 8/508 507/222 |

FOREIGN PATENT DOCUMENTS

| | | |
|---|---|---|
| CN | 101617019 A | 12/2009 |
| EA | 11696 | 4/2009 |
| RU | 2351632 C2 | 4/2009 |
| RU | 2358100 C2 | 6/2009 |
| WO | 2007/086771 A1 | 8/2007 |
| WO | 2008068645 A1 | 6/2008 |
| WO | 2008/093264 A1 | 8/2008 |
| WO | 2008096188 A2 | 8/2008 |
| WO | 2009/078745 A1 | 6/2009 |
| WO | 2009/079231 A2 | 6/2009 |

OTHER PUBLICATIONS

Search Report for the equivalent European patent application No. 09852845.8 dated May 29, 2013.
D. Ratna, J. Karger-Kocsis, "Recent advances in shape memory polymers and composites: a review," J. Mater Sci (2008) vol. 43, pp. 254-269, 2008.
R.E. Kirk, D.F. Othmer, "Encyclopedia of Chemical Technology," Joohn Wiley & Sons, Thirs Edition, vol. 16, pp. 248-276.
D.J. Guillot, J. Desroches, I. Frigaard, "Are Preflushes Really Contributing to Mud Displacement During Primary Cementing?," SPE/IADC 105903.

* cited by examiner

METHOD OF FLUID SLUG CONSOLIDATION WITHIN A FLUID SYSTEM IN DOWNHOLE APPLICATIONS

BACKGROUND

The statements in this section merely provide background information related to the present disclosure and may not constitute prior art.

In the construction and development of wells formed in subterranean formations, such as wells for the production of oil and gas, various operations are carried out that require the introduction of fluids of different types into the wellbore and/or into formation surrounding the wellbore.

During drilling of the well, for example, drilling muds or fluids are typically circulated through the drill string, through the drill bit at the end of the drill string and up through the annulus between the drilled wellbore and drill string. The circulated drilling fluid is used to carry formation rock present as cuttings or drilled solids that are removed from the wellbore as the drilling fluid is circulated back to the surface. After drilling is complete, a cement composition may be used to cement a casing or liner within the wellbore. Oftentimes, the drilling fluid is removed from the wellbore by the introduction of the cement into the wellbore. Poor liquid-liquid interface stability between the drilling fluid and the cement, however, may result in improper displacement of the drilling fluid by the cement, which may be characterized by non-uniform and/or incomplete cementing or the formation of cement fingers, which may lead to failures in zonal isolation, microannulus formation, etc.

Hydraulic fracturing is another operation conducted in wells that is used to increase the production of fluids from the subterranean formations. Hydraulic fracturing involves introducing fluids into the wellbore at very high flow rates and pressures to facilitate cracking and fracturing of the surrounding formation. In hydraulic fracturing, typically a proppant is introduced into the formation with the fracturing fluids at certain stages of the fracturing operation. The proppant (e.g. sand) is deposited in the formed fractures of the formation so the proppant prevents the fracture from closing when the pressure is reduced. This allows fluids to flow from the formation through the fractures to the wellbore so that they can be produced. Various methods exist for fracturing such formations. In one technique, the fracturing operation is carried out using multiple proppant slugs or pulses to provide heterogeneous placement of the proppant. This is accomplished by introducing alternating stages of proppant-laden fluids and proppant-free fluids so that multiple clusters of proppant are provided within the fractures of the formation. In such treatments, separate and concentrated proppant clusters are desired. Poor liquid-liquid interface stability between the proppant-laden slugs and proppant-free slugs may result in dispersion of the proppant, thus inhibiting effective placement of proppant clusters.

In downhole operations where fluids having different natures or characteristics are sequentially introduced, stabilization of the liquid-liquid interface between the fluids may be important to provide a successful treatment or operation. The present invention is directed to facilitating the stabilization of the liquid-liquid interface between such fluids.

SUMMARY

The present invention, is directed to a method of maintaining fluid slug consolidation in a fluid system for use in downhole applications. The fluid system has an interfacing fluid of a different character adjacent to the fluid slug. The method is carried out by admixing a particulate material with at least one of the fluid slug and adjacent interfacing fluid in an amount wherein discrete interfacing fluid margins are formed between the slug and the adjacent interfacing fluid under laminar flow conditions. The fluid system is introduced into a wellbore of a well formed in a subterranean formation.

In certain embodiments, the particulate material is admixed with both the fluid slug and the adjacent interfacing fluid, while in others the particulate material is admixed with only one of the fluid slug and the adjacent interfacing fluid.

In some applications, the fluid slug contains a proppant material and the adjacent interfacing fluid is substantially proppant free. In other applications, the fluid slug and adjacent interfacing fluid are both proppant free.

In certain embodiments, the fluid system is comprised of gelled fluids. The adjacent interfacing fluid may be a drilling mud and the fluid slug may be one of a cementing fluid and a drilling mud displacement fluid.

The particulate material may be degradable or non-degradable, and may be adhesive or non-adhesive. The adhesive properties of the adhesive material may change after the fluid system is introduced into the wellbore. The particulate material may be comprised of at least one of two-dimensional and three-dimensional shaped particles, and may be in the form of fibers. The physical properties of the particulate material may be changed by at least one of 1) interaction of the particulate material with the at least one of the fluid slug and adjacent interfacing fluid with which the particulate material is admixed, and 2) the downhole conditions of the well. The physical properties of the particulate material that may change may include at least one of flexibility, shape, adhesion, degradability and strength.

The particulate material may be admixed in some embodiments with at least one of the fluid slug and adjacent interfacing fluid in a concentration of from about 0.1 g/L to about 100 g/L. In others embodiments, the particulate material may be admixed with the at least one of the fluid slug and adjacent interfacing fluid in a concentration of from about 10 g/L or more.

In certain embodiments, the particulate material is admixed with the fluid slug containing a proppant material, with at least a portion of the proppant material having adhesive properties that facilitate aggregation of the proppant material and the particulate material.

The fluid system may be comprised of two or more stages of fluid slugs and adjacent interfacing fluids. The particulate material may be admixed with at least one of the fluid slug and adjacent interfacing fluid of each stage in an amount wherein discrete interfacing fluid margins are formed between the slug and the adjacent interfacing fluid for each stage under laminar flow conditions.

In certain applications, the viscosity of the base fluids forming the fluid slug and the adjacent interfacing fluid are substantially the same.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

Figure 1:
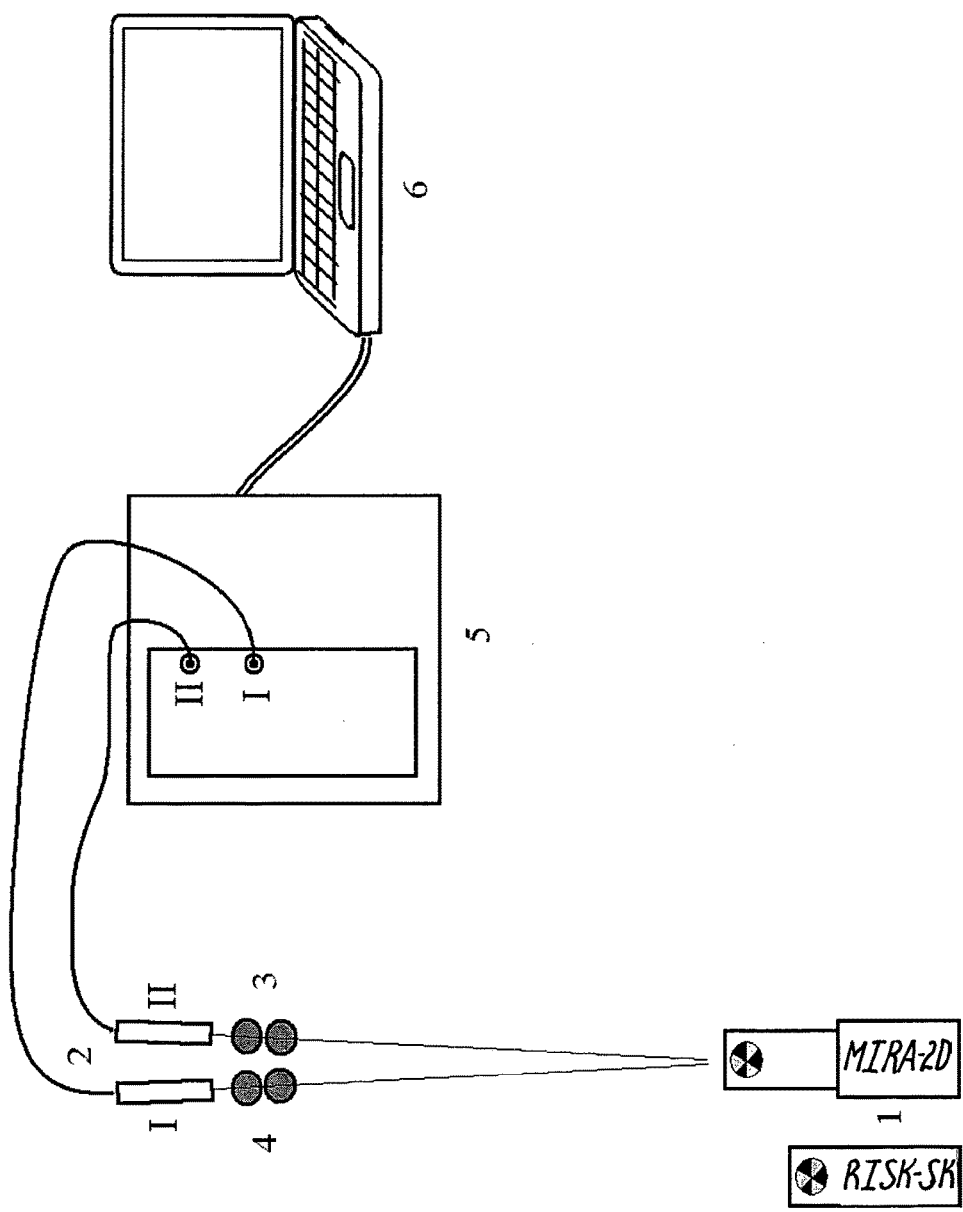
FIG. 1 is a schematic of an X-ray registration system that was used in Example 1.

The description and examples are presented solely for the purpose of illustrating the different embodiments of the invention and should not be construed as a limitation to the scope and applicability of the invention. While any compositions of the present invention may be described herein as comprising certain materials, it should be understood that the composition could optionally comprise two or more chemically different materials. In addition, the composition can also comprise some components other than the ones already cited. While the invention may be described in terms of treatment of vertical wells, it is equally applicable to wells of any orientation. The invention will be described for hydrocarbon production wells, but it is to be understood that the invention may be used for wells for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

Fibers have been included in fracturing fluid compositions as a means for improving proppant suspension and to prevent proppant settling and to reduce the amount of viscosifying agent needed for the fluid. Also fibers have been used to prevent proppant flowback. Fibers have also been used in cementing compositions to improve the cement strength. It has been discovered, however, that the addition of fibers and other particulate materials in appropriate quantities can improve the liquid-liquid interface stability of the fluids.

The fluids and fluid systems described herein are liquids. As used herein, the term "fluid" and similar expressions is meant to encompass liquid fluids that may be single or multiple phase fluids, such as those that include gases (e.g. foams), and solid or particulate materials (e.g. slurries) but that act as liquids or that are predominantly formed from liquid components. In certain embodiments, the base fluids used may have viscosities of less than 1000 mPa·s at 100 $s^{-1}$.

The present invention has application to fluids and fluid systems that are used in wells formed in subterranean formations. In particular, the invention has application to fluid systems comprised of two or more interfacing fluids that may each have a different character. Thus, for example, in hydraulic fracturing fluids, the interfacing fluids may be a pad or proppant free fluid and a proppant-laden fluid that are each introduced into the wellbore to facilitate hydraulic fracturing. In cementing operations, the interfacing fluids may be a drilling mud and cement or a drilling mud displacement fluid or spacer. In each case, the interfacing fluids have a different character or composition and may be used for a different purpose. There may be a sharp contrast in their properties (for example density, electroconductivity, transparency, etc.). The interfacing fluids may be introduced into the well as fluid slugs or may form a slug after introduction into the well. As used herein, the expression "slug" is meant to encompass a single continuous mass of fluid that generally has the same character or composition or has generally the same purpose. The invention facilitates the consolidation of the fluid slugs or interfacing fluids.

In the description that follows, while much of the discussion may be directed towards hydraulic fracturing fluids, for which the invention is particularly well suited, it should be apparent to those skilled in the art that it may have application to other fluids and fluid systems having different interfacing fluids.

The method of the invention involves admixing a particulate material within a fluid slug so that the fluid slug has discrete fluid margins. More particularly, the method of the invention involves admixing a particulate material within a fluid slug, an adjacent interfacing fluid or both in an amount or amounts wherein discrete interfacing fluid margins are formed between the slug and the adjacent interfacing fluid under laminar flow conditions. Such laminar flow conditions are similar to those flow conditions within formation fractures and constitute a worst case scenario.

By providing particulate material in the fluid in a sufficient amount and character, the yield stress of the fluid containing the particulate material can be sufficiently increased to facilitate stabilization of the liquid-liquid interface between the fluids. In certain applications, the yield stress of the fluid may be 25 Pa, 30 Pa, 40 Pa, 50 Pa, 60 Pa, 70 Pa, 80 Pa, 100 Pa or greater with a particulate or fiber loading of 10 lb/1000 gal (1.2 kg/1000 L) or more. This keeps the fluid containing the particulate material generally intact or consolidated as the fluid is transported several thousand meters down the wellbore and into the formation and facilitates the formation of discrete interfacing fluid margins and stabilization of the liquid-liquid interface of the interfacing fluid slugs.

The fluid may also be characterized by viscosity measurements using a ball fluid viscosity measurement system wherein the viscosity of the fluid incorporating the particulate matter exhibits a viscosity increase of at least 3 times greater at a shear rate of 1 $s^{-1}$ compared to the viscosity of the same fluid without the incorporation of the particulate matter. In certain applications, the viscosity increase resulting from the incorporation of the fibers or particulate matter may be 5 times or even 10 times or more than the viscosity of the same fluid without the particulate matter when measured at a shear rate of 1 $s^{-1}$.

Fluid dispersion of a fluid slug may be characterized in a transport experiment wherein a slug of fluid containing the particulate material is introduced into a conduit followed by an adjacent interfacing fluid. By measuring the length of fluid slug within a conduit over a selected distance during fluid flow the dispersion of the fluid may be characterized. The fluid slug dispersion during flow over a selected distance may be characterized by the Formula (1) below:

$$D = (L_a - L_b)/L_c \times 100\% \quad (1)$$

wherein D is the fluid slug dispersion, $L_a$ is the length of the fluid slug incorporating the particulate matter after flow over the selected distance, $L_b$ is the length of the fluid slug incorporating the particulate matter before the flow over the selected distance, and $L_c$ is the length of an adjacent interfacing fluid, which may be a clean fluid. In accordance with the invention, the dispersion D of the fluid slug should be less than 100%. In certain applications, the fluid slug dispersion D may be less than 90%, 80%, 70%, 60%, 50%, 40%, 30%, 20%, 10%, 5% or less.

The particulate materials useful for stabilizing the liquid-liquid interface may be one-, two- or three-dimensional shaped particulate materials. The particulate materials may include elongated particles such as fibers, which may be straight, curved, bent or undulated. Other non-limiting shapes may include generally spherical, rectangular, polygonal, etc. The particles may formed from a single particle body or multiple bodies that are bound or coupled together. The particles may be comprised of a main particle body having one or more projections that extend from the main body, such as a star-shape. The particles may be in the form of platelets, disks, rods, ribbons, etc. The particles may also be amorphous or irregular in shape and be rigid, flexible or plastically deformable. Fibers or elongated particles may be used in bundles. A combination of different shaped particles may be used and the particle materials may form a three-dimensional network within the fluid with which they are used. For fibers or other elongated particulates, the particles may have a length of less than about 1 mm to about 30 mm or more. In certain embodiments the fibers or elongated particulates may have a length of 12 mm or less with a diameter or cross dimension of about 200 microns or less, with from about 10 microns to about 200 microns being typical. For elongated materials, the materials may have a ratio between any two of the three dimensions of greater than 5 to 1. In certain embodiments, the fibers or elongated materials may have a length of greater than 1 mm, with from about 1 mm to about 30 mm, from about 2 mm to about 25 mm, from about 3 mm to about 20 mm, being typical. In certain applications the fibers or elongated materials may have a length of from about 1 mm to about 10 mm (e.g. 6 mm). The fibers or elongated materials may have a diameter or cross dimension of from about 5 to 100 microns and/or a denier of about 0.1 to about 20, more particularly a denier of about 0.15 to about 6.

The particulate material may be formed from a degradable material or a non-degradable material. These materials may be organic or inorganic. Non-degradable materials are those wherein the particulate remains substantially in its solid form within the well fluids. Examples of such materials include glass, ceramics, basalt, carbon and carbon-based compound, metals and metal alloys, etc. Polymers and plastics that are non-degradable in the well fluids may also be used as non-degradable particulates. These may include high density plastic materials that are oil-resistant and exhibit crystallinity of greater than 10%. Other non-limiting examples of polymeric materials include nylons, acrylics, styrenes, polyesters, polyethylene, oil-resistant thermoset resins and combinations of these.

Degradable particulate materials may include those materials that can be softened, dissolved, reacted or otherwise made to degrade within the well fluids. Such materials may be soluble in aqueous fluids or in hydrocarbon fluids. Oil-degradable particulate materials may be used that degrade in the produced fluids. Non-limiting examples of degradable materials may include, without limitation, polyvinyl alcohol, polyethylene terephthalate (PET), polyethylene, dissolvable salts, polysaccharides, waxes, benzoic acid, naphthalene based materials, magnesium oxide, sodium bicarbonate, calcium carbonate, sodium chloride, calcium chloride, ammonium sulfate, soluble resins, and the like, and combinations of these. Particulate material that degrades when mixed with a separate agent that is introduced into the well so that it mixes with and degrades the particulate material may also be used. Degradable particulate materials may also include those that are formed from solid-acid precursor materials. These materials may include polylactic acid (PLA), polyglycolic acid (PGA), carboxylic acid, lactide, glycolide, copolymers of PLA or PGA, and the like, and combinations of these.

In many applications, fibers are used as the particulate material, either alone or in combination with other non-fiber particulate materials. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp., Wichita, Kans., USA, 67220. Other examples of useful fibers include, but are not limited to, polylactic acid polyester fibers, polyglycolic acid polyester fibers, polyvinyl alcohol fibers, and the like.

The fibers or particulate materials can be formed from or provided with a material that provides tacky or adhesive properties. The adhesive coefficient of the adhesive materials may change, including both a decrease or increase in the adhesive coefficient. The particulate material may have an inherently adhesive surface, or the particulate can be chemically or physically modified to provide the adhesive properties in situ. This may involve providing an adhesive coating on the particulate. The particulate material may be pre-coated or such a coating may be added on the fly as the particulate is added to the introduced well fluid at the surface. The coating or adhesive additive may wet and coat the particulate surface to provide the adhesive properties. In certain instances, a removable non-adhesive coating may be provided on the surface of the particulate, with an adhesive surface underlying the non-adhesive protective coating. The non-adhesive-coating may then be removed to expose the underlying adhesive material.

The adhesive coatings may also be removable. The adhesive or non-adhesive coatings may be removed chemically or physically, such as through dissolution in the fluids. Adhesive properties may also change, such as through temperature changes, which may increase or decrease the adhesive properties. Variations in thicknesses of the removable coatings may increase or decrease the duration of the adhesive or non-adhesive properties. Examples of adhesive materials that may provide adhesive properties to the particulate include polymer coatings where the polymer is in a viscoelastic state or is at or above its melting temperature. Another example is coating of particles with a concentrated polymer solution. The polymer solution may be introduced in the form of an emulsion. Other examples of adhesive compounds may be found in International Publication Nos. WO2009/078745A1 and WO 2009/079231A2, which are each incorporated herein by reference.

Resins, such as those described for use with the proppant materials, described further on, may also provide the adhesive properties. The particulate may have self-adherent surface, wherein the particulate has a tendency to agglomerate with or adhere to other particulate. In certain embodiments, the particulate may be non-adherent to proppant or other surfaces, such as surface piping, pumps and wellbore tubing. The particulate may have hydrophilic or hydrophobic coatings or be formed from such materials to provide an affinity or lack of affinity to certain fluids or materials.

In some embodiments, the physical properties of the particulate material may change. This may be due to interaction of the particulate material with the fluid with which the particulate material is mixed or may be due to the downhole conditions of the well. Such change in physical properties may include changes in adhesion and degradation, as already discussed. Additionally, the particulate may change in shape, size, flexibility, strength, etc. Such changes may be the result of thermosetting, thermoplastic, phase changing characteristics, etc. The particulate material may swell in the fluids, thus changing in shape and/or size. The changes may also be the result of chemical interactions with compounds provided or added to the fluids. Some materials with such change properties include shape memory polymers, as disclosed in the Journal of Material Science, Vol. 43; pp. 254-269, 2008, which is herein incorporated by reference. Changes may also occur by the softening or melting of the polymer, for example, poly(methyl methacrylate) (PMMA), softens at 80° C. Examples of swellable materials include, for example, fibers or particles formed from polyacrylamide and similar materials.

The particulate materials may be present in the fluid with which they are used in an amount of from about 0.1 g/L to about 100 g/L. In certain embodiments they are used in amounts of 10 g/L or more. In certain applications the amount of the fibers is greater than 10% by total weight of the fluid. In certain embodiments, the more particulate or fiber material used the better. Therefore, the amount of such materials may be limited only by the equipment limitations used in transporting such materials. At such levels, the fluid may be considered saturated with the particulate material.

In certain embodiments, the particulate material is used in fluids containing proppants. These are typically fracturing fluids wherein the proppant within the fractures keeps the propagated fractures from closing. The proppant materials can be natural or synthetic, coated, or contain chemicals; more than one can be used sequentially or in mixtures of different sizes or different materials. Proppants and gravels in the same well can be the same material and/or the same size as one another. The term "proppant" is intended to include gravel in this discussion. In general the proppant used may have an average particle size of from about 0.15 mm to about 2.5 mm, more particularly, but not limited to typical size ranges of about 0.25-0.43 mm, 0.43-0.85 mm, 0.85-1.18 mm, 1.18-1.70 mm, and 1.70-2.36 mm. Normally the proppant will be present in the slurry in a concentration of from about 0.12 kg proppant added to each L of carrier fluid to about 3 kg proppant added to each L of carrier fluid. In certain applications the proppant concentration will be from about 0.12 kg proppant added to each L of carrier fluid to about 1.5 kg proppant added to each L of carrier fluid.

In certain embodiments of the invention the proppant material is substantially insoluble in the fluids of the formation. The proppant may be selected based on the rock strength, injection pressures, types of injection fluids, or even completion design. Suitable proppant materials may include, but are not limited to, sand, sintered bauxite, glass beads, ceramic materials, naturally occurring materials, or similar materials. Mixtures of proppants can be used as well. Naturally occurring materials may be underived and/or unprocessed naturally occurring materials, as well as materials based on naturally occurring materials that have been processed and/or derived. Suitable examples of naturally occurring materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization, processing, etc., some nonlimiting examples of which are proppants supplied under the tradename LiteProp™ available from BJ Services Co., made of walnut hulls impregnated and encapsulated with resins. Further information on some of the above-noted compositions thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference. Other proppant materials may include drill cuttings that are circulated out of the well with drilling fluids.

All or some of the proppant materials may be provided with adhesive properties as well. The adhesive properties may be provided by a resin coating. The resins used may include, for example, epoxy, phenolic (e.g. phenol formaldehyde), polyurethane elastomers, amino resins, polyester resins, acrylic resins, etc. Examples of resin coated particles are described in U.S. Pat. Nos. 3,929,191, 4,585,064 and 5,422,183, which are each herein incorporated by reference in their entireties. The coating thickness may vary, but resin coatings that make up of from about 1 to about 99% by total weight of resin coated proppant (RCP) may be used, more particularly from about 1 to about 50% by total weight of RCP.

The resin coated proppants may be coated particles where the resin is initially uncured when the proppant slurry is initially formed. The non-cured RCP may initially be generally solid and nontacky at surface conditions, thus facilitating handling and preparation of the particle slurry, as the proppant particles do not tend to stick together. Upon introduction into the fracture in the subterranean formation, the resin will soften due to the higher temperatures encountered. Subsequently, the resin cures or crosslinks so that it becomes hard and infusible, with some flexibility. Typical temperatures that facilitate curing range from about 40° C. to about 250° C. At lower temperatures, i.e. temperatures of less than about 60° C., curing aids may be used to provide sufficient consolidation within a reasonable length of time. Such curing aids are known by those skilled in the art and may include, for example, isopropanol, methanol and surfactants with alcoholic compounds.

Curing or crosslinking of the resin may occur merely due to heating. The resin may be selected so that curing occurs at particular temperatures and so that certain time periods may be required for curing to ensure that the resin does not cure too quickly. Resins having cure times of from about 1 hour to about 75 hours or more may be used to ensure that sufficient time is allowed for positioning of the proppant pack.

Pre-cured resin coated proppants includes those resin coated proppant particles where the resin has been at least partially cured or crosslinked at the surface prior to introduction into the well or fracture. Such pre-cured RCP may be particularly useful with fracturing fluids as they may be more compatible with fracturing fluids and do not require temperature for activation. The pre-cured resin coated proppant particles may only interact physically with each other, with no chemical bonding. As a result, a thicker resin coating may be required compared to uncured RCP. The coatings used may be flexible ones that can be easily deformed under pressure. This coupled with thicker coating on the proppant surface may give rise to stronger interactions between particles. Such materials included rubbers, elastomers, thermal plastics or plastics.

Examples of suitable commercially available non-cured resin coated particles include Super HS, Super LC, Super TF, Super HT, MagnaProp, DynaProp, OptiProp and PolaProp, all available from Santrol, Inc., Fresno, Calif. and Ceramax resin coated proppants, available from Borden Chemical, Columbus, Ohio. The resin coated particles may also include particles having a tackifying or similar coating that provides similar characteristics to the RCP previously described, such as the coated sand, marketed under the name SandWedge, available from Halliburton Energy Services, Inc., which may be added on the fly to the slurry.

The adhesive material of the particulate and/or the proppant materials may facilitate aggregation of the particulate and/or proppant materials. The proppant may also have self-aggregation properties. In certain embodiments, an adhesive material may be added that wets or coats one of or both of the particulate and proppant materials. The proppant materials may have adhesive properties that facilitate aggregation of the non-proppant particulate materials, which may be non-adhesive.

In certain embodiments, the particulate materials used for stabilizing the liquid-liquid interface may be incorporated into fracturing fluids. The fracturing fluids and systems used for carrying out hydraulic fracturing are typically aqueous fluids. The aqueous fluids are typically viscosified so that they have sufficient viscosities to carry or suspend proppant materials, prevent fluid leak off, etc. In order to provide the higher viscosity to the aqueous fracturing fluids water soluble or hydratable polymers are often added to the fluid. These polymers may include, but are not limited to, guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used. Any useful polymer may be used in either crosslinked form, or without crosslinker in linear form. Xanthan, diutan, and scleroglucan, three biopolymers, have been shown to be useful as viscosifying agents. Synthetic polymers such as, but not limited to, polyacrylamide and polyacrylate polymers and copolymers are used typically for high-temperature applications.

In some embodiments of the invention, a viscoelastic surfactant (VES) is used as the viscosifying agent for the aqueous fluids. The VES may be selected from the group consisting of cationic, anionic, zwitterionic, amphoteric, nonionic and combinations thereof. Some nonlimiting examples are those cited in U.S. Pat. Nos. 6,435,277 and 6,703,352, each of which is incorporated herein by reference. The viscoelastic surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

The fluids may also contain a gas component. The gas component may be provided from any suitable gas that forms an energized fluid or foam when introduced into the aqueous medium. See, for example, U.S. Pat. No. 3,937,283 (Blauer et al.), hereinafter incorporated by reference. The gas component may comprise a gas selected from nitrogen, air, argon, carbon dioxide, and any mixtures thereof. Particularly useful are the gas components of nitrogen or carbon dioxide, in any quality readily available. The fluid may contain from about 10% to about 90% volume gas component based upon total fluid volume percent, more particularly from about 20% to about 80% volume gas component based upon total fluid volume percent, and more particularly from about 30% to about 70% volume gas component based upon total fluid volume percent.

The present invention has particular application to heterogeneous proppant placement in hydraulic fracturing operations wherein proppant clusters are positioned within the fracture. Examples of such fracturing operations for heterogeneous proppant placement are described in U.S. Pat. No. 7,581,590 and International Publication No. WO2007/086771A1, both of which are incorporated herein in their entireties for all purposes. Generally, such heterogeneous proppant placement involves the use of multiple alternating proppant-laden and proppant-free slugs that are sequentially introduced into the formation to facilitate positioning of spaced apart clusters of proppant within the fractures of the formation.

In heterogeneous proppant placement or in other fracturing operations wherein a proppant-free fluid immediately follows or proceeds a proppant-laden fluid, the particulate material used to stabilize the liquid-liquid interface may be contained in one or both such adjacent interfacing fluids. The particulate material may be admixed continuously to the fracturing fluids, while the proppant may be added in pulses. Alternatively, the non-proppant particulate material may be added in pulses, while the proppant is added to the fluid continuously. In some embodiments, the proppant-free fluids or pulses may have a higher content of the particulate material. In other embodiments, the proppant-laden fluids or pulses may have a higher content of particulate material. In still other embodiments, the amount of particulate material may be generally the same in both the proppant-free and proppant-laden fluids and be generally continuously dispersed throughout the fluids.

Additionally, the fibers or other non-proppant particulate materials may be the same or different in the different fluid interfacing fluid stages. This may include particulates that are different. This may include differences in material, shape, adhesive properties, size or other characteristics. In certain applications, only degradable particulate materials, such as those previously described, are used in the proppant-free fluids so that they can be removed and do not otherwise foul the formation after the treatment. Degradable particulate materials may also be used in the proppant-laden fluid. Non-degradable fibers or particulate materials, however, may also be used with those fluids containing proppant. The particulate materials in the proppant-laden fluid may also prevent settling of the proppant. In certain embodiments, the viscosity of the base fluids used for the interfacing fluids may be generally the same or similar. As discussed herein, viscosities of the base fluids are the viscosities fluids prior to the addition of proppant or particulate materials. The fluids are typically viscosified with viscosifying agents, as previously described. In certain applications the base fluids used may be the same in each stage, with the main differences being only the amount or type of particulate material or proppant used or the presence or non-presence of particulate material or proppant. Two fluids with the substantially the same viscosity show minimal inclination to viscous fingering. As discussed earlier, in certain embodiments the fluids may have viscosities of less than 1000 mPa·s at 100 s$^{-1}$.

In addition to fracturing treatments, the present invention also has particular application for the displacement of drilling fluids. Drilling mud displacement methods are described in U.S. Pat. No. 4,453,598, which is incorporated herein by reference. In such applications, the drilling fluid is displaced with another fluid. The particulate material facilitates the stabilization of the liquid-liquid interface between the drilling fluid and the subsequently introduced fluid. The subsequent fluid may include a non-cement spacer or displacement fluid specifically used for displacing the drilling fluid or it may be the cement used for cementing the wellbore. These are typically aqueous fluids that may contain a salt or weighting agent, viscosifier, etc., to facilitate displacement of the drilling fluids. The particulate materials described previously may be added to the spacer or displacement fluid to stabilize the liquid-liquid interface between the drilling fluid and the subsequent fluid. Alternatively, the drilling fluid may be displaced with a cementing composition used in cementing a casing within the wellbore. The cementing compositions contain mortar or cementitious materials, water and other additives. The particulate materials previously described are admixed with the cement composition to facilitate stabilization of the liquid-liquid interface. The cement composition containing the particulate materials may be included in both the cement and any spacer used ahead of the cement.

The spacer fluid may be followed by wash fluid or vice versa. The spacer-wash fluid or wash fluid-spacer sequence may be repeated several times. Spacers exhibit carefully designed density and rheology to ensure good cement placement while maintaining suspension of the weighting agent used to control their density. In the vast majority of the cases, spacers are used in laminar flow. Their composition can be optimized to decrease their viscosity without compromising stability, allowing placement in turbulent flow in small annuli, provided pipe standoff is relatively high.

Washes are preflushes with a viscosity very close to that of water or oil. Their density is usually also close to that of water or oil, although water-based washes can be densified using water soluble salts. Their common feature is that they can be readily pumped in turbulent flow at a relatively high Reynolds numbers. The choice of washes are evaluated based on compatibility issues and on efficiency of the displacement process. For water-based muds the simplest and less costly wash is composed of fresh water. For more efficient mud thinning and dispersion, dispersants and surfactants are commonly added. For non-aqueous drilling fluids, the wash is either a mixture of water, mutual solvent, and surfactants or oil followed by a water-based wash, as described in SPE/IADC 105903, incorporated by reference herein.

The following examples serve to further illustrate the invention.

EXAMPLES

Example 1

Proppant-laden fluid slugs were tested to investigate the influence of fiber particles on slug dispersion. Two 20 lb/1000 gal (2.4 kg/1000 L) of guar crosslinked aqueous fluids were formed and used for the tests. A proppant-laden slug was formed in each fluid at a proppant concentration of 8 lb/gal (0.95 kg/L) proppant. The proppant used was 20/40 mesh (0.84 mm/0.42 mm) sand. Degradable polyethylen-terephthalate (PET) polymer fibers having an average length of approximately 6 mm were used in one fluid at a fiber concentration of about 3.6 g/L. The other fluid contained no fibers. Both fluids were injected into a 33 meter fluid loop with 2 cm ID tube at a laminar flow rate of 8 L/min. A laminar flow rate was used to simulate fluid flow within a formation. An MIRA 2D X-ray system with a peak voltage at the anode of 150 kV and a shock capacity of 40 pF was used to detect the fluid density during the experiment. The X-ray registration system had the configuration as shown in FIG. 1. As shown in FIG. 1, an X-ray source (1) and sensors (2) (Etalon Sensor I, and Measuring Sensor II) were used. Sensors I and II were placed at the same distance from the focus of the X-rays unit. In between of the X-ray tube and Sensor II, a tube with the gel flow (3) was positioned. The tube was positioned so that it passed the Sensor II twice, once immediately behind the pump and another in front of the drain into a recycling tank. Thus, the proppant slug passed on the sensors' trajectory twice.

Figure 2:
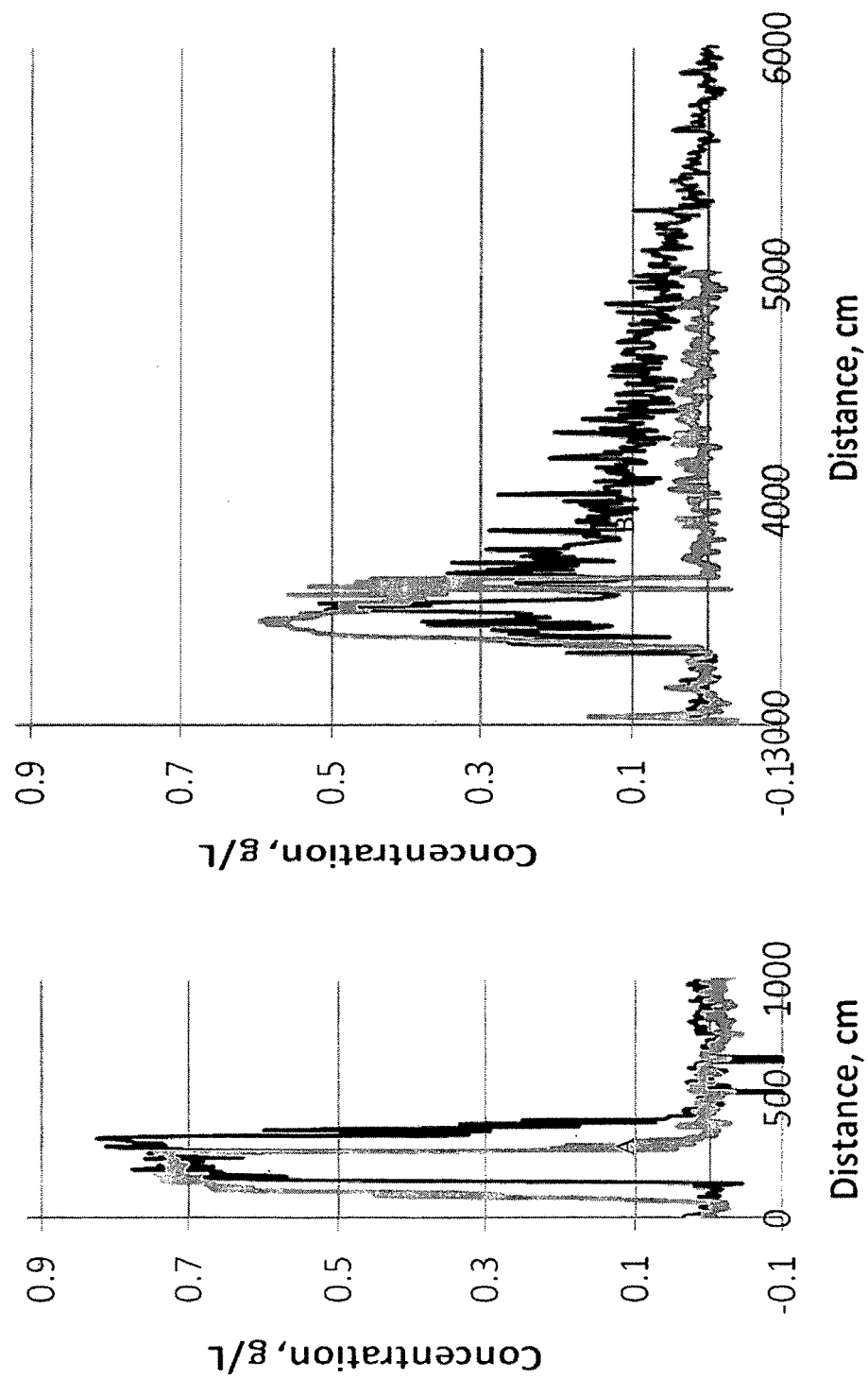
FIG. 2 is a plot of proppant slug concentrations over distance of two circulated fluids, with one fluid containing fiber particles in an amount to provide discrete interfacing fluid margins and the other fluid without such fiber particles.

FIG. 2 shows a plot of the proppant slug concentrations over distance of two circulated fluids, with one fluid (20) containing fiber particles and the other fluid (18) without such fiber particles. Section A shows the slugs at the beginning of tube flow and Section B shows the slugs after 33 m of tube flow. FIG. 2 shows that the fluid (20) containing fibers at the margins of the slug containing proppant were sharp and distinctive from the remaining clean gel slug interval. In contrast, the proppant slug of the fluid (18) containing no fibers did not stay consolidated, as exhibited by the dispersion of the proppant concentration within the circulated fluid, showing that the liquid-liquid interface of the proppant slug and clean slug did not stay intact. No discernable fluid margins were apparent in the fluid (18) containing no fibers.

Example 2

Figure 3:
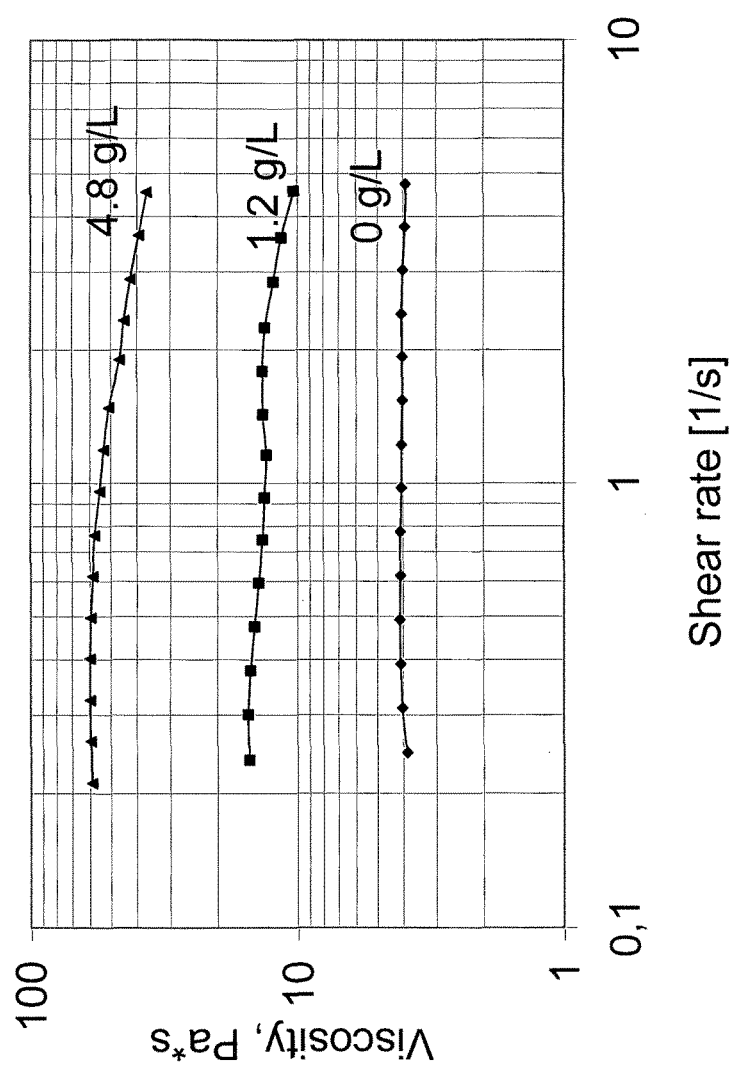
FIG. 3 is a plot of fluid viscosity at different shear rates for fluids containing different amounts of fiber particles.

Ball viscosity measurements were conducted using aqueous fluids containing 30 lbs/1000 (3.6 kg/1000 L) of crosslinked guar with varying amounts of (PET) polymer fibers, as described in Example 1. The amount of fibers used was 0 lb/1000 gal (0 kg/1000 L), 10 lb/1000 gal (1.2 kg/1000 L) and 40 lb/1000 gal (4.8 kg/1000 L). The ball viscosities at different shear rates was then measured. The results are presented in FIG. 3.

Example 3

Figure 4:
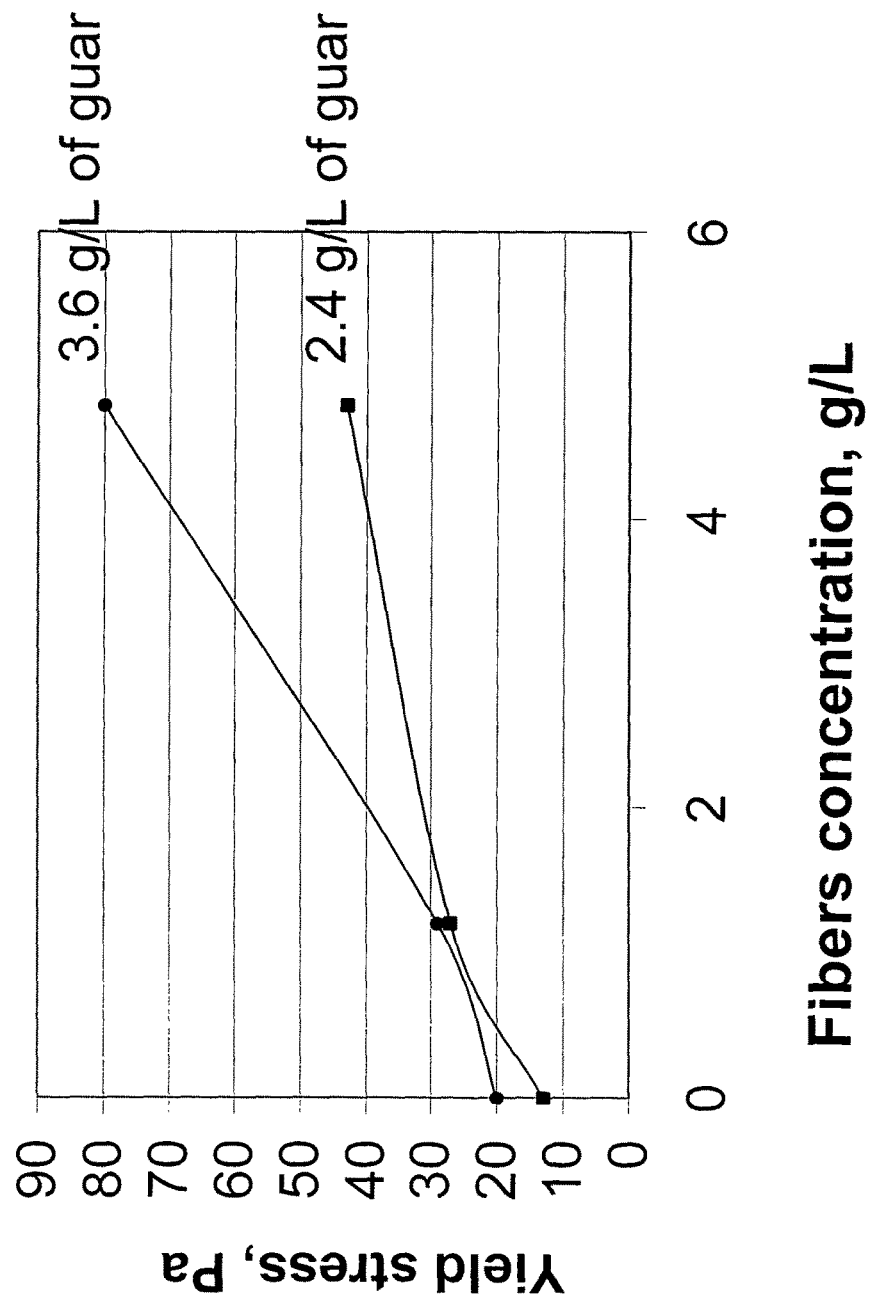
FIG. 4 is a plot of the yield stress of different fluids containing varying amounts of fiber particles.

Two different crosslinked guar fluids containing 30 lb/1000 gal (3.6 kg/1000 L) and 40 lb/1000 gal. (4.8 kg/1000 L) guar and various loadings of PET fibers, as used in Example 1, were tested in a rheometer to determine yield stress at 50° C. The amount of fibers used was 0 lb/1000 gal (0 kg/1000 L), 10 lb/1000 gal (1.2 kg/1000 L) and 40 lb/1000 gal (4.8 kg/1000 L). Torque was applied to the fluid to determine the yield point of each fluid. The results are presented in FIG. 4.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of maintaining fluid slug consolidation in a fluid system for use in downhole applications, the fluid system having an interfacing fluid of a different character adjacent to the fluid slug, the method comprising:
    admixing a particulate material with the fluid slug in an amount wherein discrete and stable interfacing fluid margins are formed between the slug and the adjacent interfacing fluid under laminar flow conditions, wherein the particulate material improves interfacial stability between the fluid slug and the fluid system; and
    introducing the fluid system into a wellbore of a well formed in a subterranean formation,
    wherein the particulate material is non-adhesive and is degradable polyethylene terephthalate polymer fibers.

2. The method of claim 1, wherein: the particulate material is admixed with both the fluid slug and the adjacent interfacing fluid.

3. The method of claim 1, wherein: the particulate material is admixed with only one of the fluid slug and the adjacent interfacing fluid.

4. The method of claim 1, wherein: the fluid slug contains a proppant material and wherein the adjacent interfacing fluid is substantially proppant free.

5. The method of claim 1, wherein: the fluid slug and adjacent interfacing fluid are both proppant free.

6. The method of claim 1, wherein: the fluid system is gelled by crosslinked guar.

7. The method of claim 1, wherein: the adjacent interfacing fluid is a drilling mud and the fluid slug is one or a cementing fluid and a drilling mud displacement fluid.

8. The method of claim 1, wherein: the particulate material is admixed with the at least one of the fluid slug and adjacent interfacing fluid in a concentration of from about 0.1 g/L to about 100 g/L.

9. The method of claim 1, wherein: the particulate material is admixed with the at least one of the fluid slug and adjacent interfacing fluid in a concentration of from about 10 g/L or more.

10. The method of claim 1, wherein: the particulate material is non-degradable.

11. The method of claim 1, wherein: the particulate material is comprised of an adhesive material.

12. The method of claim 11, wherein: the adhesive properties of the adhesive material changes after the fluid system is introduced into the wellbore.

13. The method of claim 1, wherein: the particulate material is comprised of at least one of two-dimensional and three-dimensional shaped particles.

14. The method of claim 1, wherein: physical properties of the particulate material are changed by at least one of 1) interaction of the particulate material with the at least one of the fluid slug and adjacent interfacing fluid with which the particulate material is admixed, and 2) downhole conditions of the well.

15. The method of claim 14 wherein: the physical properties of the particulate material that are changed include at least one or flexibility, shape, adhesion and strength.

16. The method of claim 4, wherein: the particulate material is admixed with the fluid slug containing the proppant material, at least a portion of the proppant material having adhesive properties that facilitate aggregation of the proppant material and the particulate material.

17. The method of claim 1, wherein: the fluid system is comprised of two or more stages of fluid slugs and adjacent interfacing fluids, and wherein the particulate material is admixed with the fluid slug of each stage in an amount wherein discrete interfacing fluid margins are formed between the slug and the adjacent interfacing fluid for each stage under laminar flow conditions.

18. The method of claim 1, wherein: the viscosity of the base fluids forming the fluid slug and the adjacent interfacing fluid are substantially the same.

* * * * *